(12) United States Patent
dos Santos

(10) Patent No.: US 10,834,070 B1
(45) Date of Patent: Nov. 10, 2020

(54) REMOTE LOGGING AGENT FOR ACCESSING APPLICATION SERVER LOG DATA

(71) Applicant: Dell Products L. P., Round Rock, TX (US)

(72) Inventor: Felipe Silva dos Santos, Santa Maria (BR)

(73) Assignee: Dell Products L.P., Rock Round, TX (US)

( * ) Notice: Subject to any disclaimer, the term of this patent is extended or adjusted under 35 U.S.C. 154(b) by 186 days.

(21) Appl. No.: 15/883,453

(22) Filed: Jan. 30, 2018

(51) Int. Cl.
- *H04L 29/06* (2006.01)
- *H04L 29/14* (2006.01)
- *G06F 21/62* (2013.01)
- *G06F 21/41* (2013.01)
- *H04L 29/08* (2006.01)

(52) U.S. Cl.
CPC .......... *H04L 63/0815* (2013.01); *G06F 21/41* (2013.01); *G06F 21/6218* (2013.01); *H04L 69/40* (2013.01); *H04L 29/06047* (2013.01); *H04L 67/025* (2013.01)

(58) Field of Classification Search
CPC . H04L 63/0815; H04L 21/41; H04L 21/6218; H04L 69/40; H04L 29/06047; H04L 67/025
See application file for complete search history.

(56) References Cited

U.S. PATENT DOCUMENTS

| | | | | |
|---|---|---|---|---|
| 7,577,659 B2* | 8/2009 | Schutz | ..................... | G06F 21/31 |
| 9,323,930 B1* | 4/2016 | Satish | ................. | H04L 63/1433 |
| 2007/0157156 A1* | 7/2007 | Meier | ........................ | G06F 8/10 717/101 |
| 2013/0086060 A1* | 4/2013 | Donley | .................... | G06F 21/55 707/736 |
| 2013/0091559 A1* | 4/2013 | Thun | ....................... | H04L 63/08 726/9 |
| 2014/0082513 A1* | 3/2014 | Mills | ..................... | H04L 41/069 715/744 |
| 2014/0188789 A1* | 7/2014 | Tait | ........................ | G06F 16/116 707/609 |
| 2016/0301675 A1* | 10/2016 | Wiles | .................... | H04L 63/104 |
| 2017/0048252 A1* | 2/2017 | Straub | ..................... | H04L 67/06 |
| 2019/0278627 A1* | 9/2019 | Kapinos | ................ | G06F 9/4843 |

\* cited by examiner

*Primary Examiner* — Techane Gergiso

(74) *Attorney, Agent, or Firm* — Ryan, Mason & Lewis, LLP

(57) ABSTRACT

A remote logging agent is provided for accessing application log data from one or more servers. One method comprises: obtaining a logging configuration file for an application that identifies one or more servers associated with the application, a communication protocol and authentication credentials for accessing the identified servers, a path where log data is stored on the identified servers, and a storage destination for storing log data obtained from the identified servers; establishing, using a logging agent, a connection to the identified servers using the communication protocol and the authentication credentials, wherein the logging agent is distinct and remote from the application and the identified servers; obtaining, using the logging agent, the log data from the identified servers using the path; and storing, using the logging agent, the log data from the identified servers in the one storage destination specified for storing the obtained log data.

20 Claims, 6 Drawing Sheets

FIG. 2

```
1  {
2      "appToMonitor": [
3          {
4              "name": "CMS-BRAMS",
5              "retrieveMethod": "SSH",
6              "localLog": [
7                  {
8                      "logRotation": "20MB",
9                      "logsToKeep": 1,
10                     "logFolder": "c:/logs_to_parse/logs/"
11                 }
12             ],
13             "serverCredentials": [
14                 {
15                     "user": "accountToConnect",
16                     "password": "xxx",
17                     "sshKey": "ssh-rsa 2048 00:00:00:00:00:00:00:00:00:00:52:6e:9a"
18                 }
19             ],
20             "remoteLog": [
21                 {
22                     "logFile": "remote_application.log",
23                     "logFolder": "/the/remote/logs/folder/on/server/"
24                 }
25             ],
26             "servers": [
27                 {
28                     "shortDescription": "Failserver05",
29                     "fqdn": "server05.us.abc.com"
30                 },
31                 {
32                     "shortDescription": "Failserver06",
33                     "fqdn": "server06.us.abc.com"
34                 },
35                 {
36                     "shortDescription": "Failserver07",
37                     "fqdn": "server07.us.abc.com"
```

```
38      },
39      {
40          "shortDescription": "Primaryserver05",
41          "fqdb": "server205.us.abc.com",
42      },
43      {
44          "shortDescription": "Primaryserver06",
45          "fqdn": "server206.us.abc.com;;
46      },
47      {
48          "shortDescription": Primaryserver07",
49          "fqdn.server207.us.abc.com"
50      }
51      ]
52  },
53  {
```

| Network > cS > logs_to_parse > logs > CMS-BRAMS | | | |
|---|---|---|---|
| NAME | DATE MODIFIED | TYPE | SIZE |
| CMS-BRAMS_Failover05.log | 12/27/2017 4:34 AM | TEXT DOCUMENT | 18,154 KB |
| CMS-BRAMS_Failover05.log.1 | 12/26/2017 8:18 PM | 1 FILE | 20,511 KB |
| CMS-BRAMS_Failover06.log | 1/17/2018 4:36 PM | TEXT DOCUMENT | 20,248 KB |
| CMS-BRAMS_Failover06.log.1 | 1/17/2018 4:29 PM | 1 FILE | 20,489 KB |
| CMS-BRAMS_Failover07.log | 1/17/2018 4:36 PM | TEXT DOCUMENT | 18,315 KB |
| CMS-BRAMS_Failover07.log.1 | 1/17/2018 9:16 AM | 1 FILE | 20,483 KB |
| CMS-BRAMS_Primary05.log | 12/26/2017 10:44 ... | TEXT DOCUMENT | 123 KB |
| CMS-BRAMS_Primary06.log | 12/26/2017 10:44 ... | TEXT DOCUMENT | 1 KB |
| CMS-BRAMS_Primary07.log | 12/26/2017 10:44 ... | TEXT DOCUMENT | 1 KB |

300

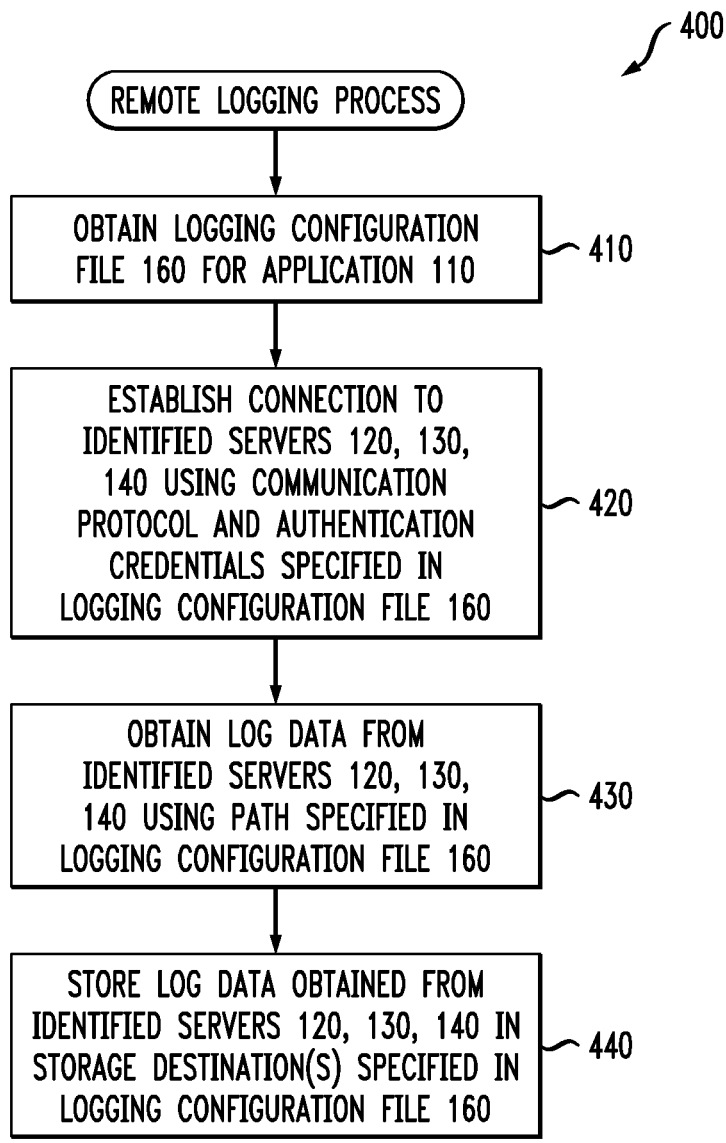

REMOTE LOGGING AGENT FOR ACCESSING APPLICATION SERVER LOG DATA

FIELD

The field relates generally to the logging of data from applications and/or servers.

BACKGROUND

A server log comprises one or more log files maintained by a server, typically comprising a list of server activities, such as page requests and/or performance data. A particular application may employ multiple servers and the log data may be collected on an application level for the various servers associated with the application. Web analytic techniques are often employed to parse and process the log files. Existing logging tools typically require a software license and/or the installation of logging agents on the monitored servers.

A number of logging tools and associated logging agents exist, such as those commercially available from Splunk Inc. of San Francisco, Calif., that collect and index server and application logs. The logging agents are installed on each monitored server to gather the logs from the server and to forward the gathered log data to the logging tool. Installing the logging agents in a production server to monitor an application, however, often requires special approval or permissions and can decrease the availability of server resources.

A need exists for improved techniques for collecting and storing server log data.

SUMMARY

In one embodiment, a remote logging agent is provided for accessing application log data. An exemplary method comprises: obtaining a logging configuration file for an application, wherein the logging configuration file identifies one or more servers associated with the application, a communication protocol and authentication credentials for accessing the identified servers, a path where log data is stored on each of the identified servers, and a storage destination for storing log data obtained from the identified servers; establishing, using a logging agent, a connection to the identified servers using the communication protocol and the authentication credentials, wherein the logging agent is distinct and remote from the application and the identified servers; obtaining, using the logging agent, the log data from the identified servers using the path; and storing, using the logging agent, the log data from the identified servers in the storage destination specified for storing the obtained log data.

In some embodiments, the storage destination specified for storing the obtained log data is associated with a predefined logging tool. The logging configuration file is optionally specified using a predefined data interchange format. The log data can be obtained from a plurality of servers and/or applications in parallel.

Other illustrative embodiments include, without limitation, apparatus, systems, methods and computer program products comprising processor-readable storage media.

BRIEF DESCRIPTION OF THE DRAWINGS

FIG. 2 illustrates the logging configuration file of FIG. 1 in further detail, according to an embodiment of the disclosure;

FIG. 3 illustrates a number of exemplary log storage destination folders, according to some embodiments;

FIG. 4 is a flow chart illustrating an exemplary implementation of a remote logging process, according to one embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide a remote logging agent for accessing application server log data and for storing the retrieved log data in storage destination folders.

In one or more embodiments, the disclosed remote logging agent collects logs from one or more servers without a local installation at the server and provides the collected logs to a designated logging tool. In this manner, the disclosed remote logging agents retrieve application logs from one or more servers and/or applications in real time, rather than installing and configuring a log agent on each production server to be monitored. In one embodiment of the disclosure, the remote logging agent is configured to point to the path where the logs reside on each server. The exemplary remote logging agent uses the specified path information to gather the logs and to propagate them to a designated logging tool.

In some embodiments, the disclosed remote logging agent is configured using a data interchange format, such as JavaScript Object Notation (JSON). Generally, JSON is an open standard file format that uses human-readable text to transmit data objects, for example, between browsers and servers. As discussed further below in conjunction with FIG. 2, the configuration information for the exemplary remote logging agent identifies an application to be monitored; one or more servers to be monitored for the application; the necessary communication protocols and authentication credentials for accessing each identified server; a path where log data is stored by each identified server; and at least one storage destination, such as a destination folder, for storing the log data obtained from each identified server. The disclosed remote logging agent can optionally obtain logs from a plurality of applications and/or servers in parallel, using a plurality of supported protocols, as discussed further below in conjunction with FIG. 1.

Figure 1:
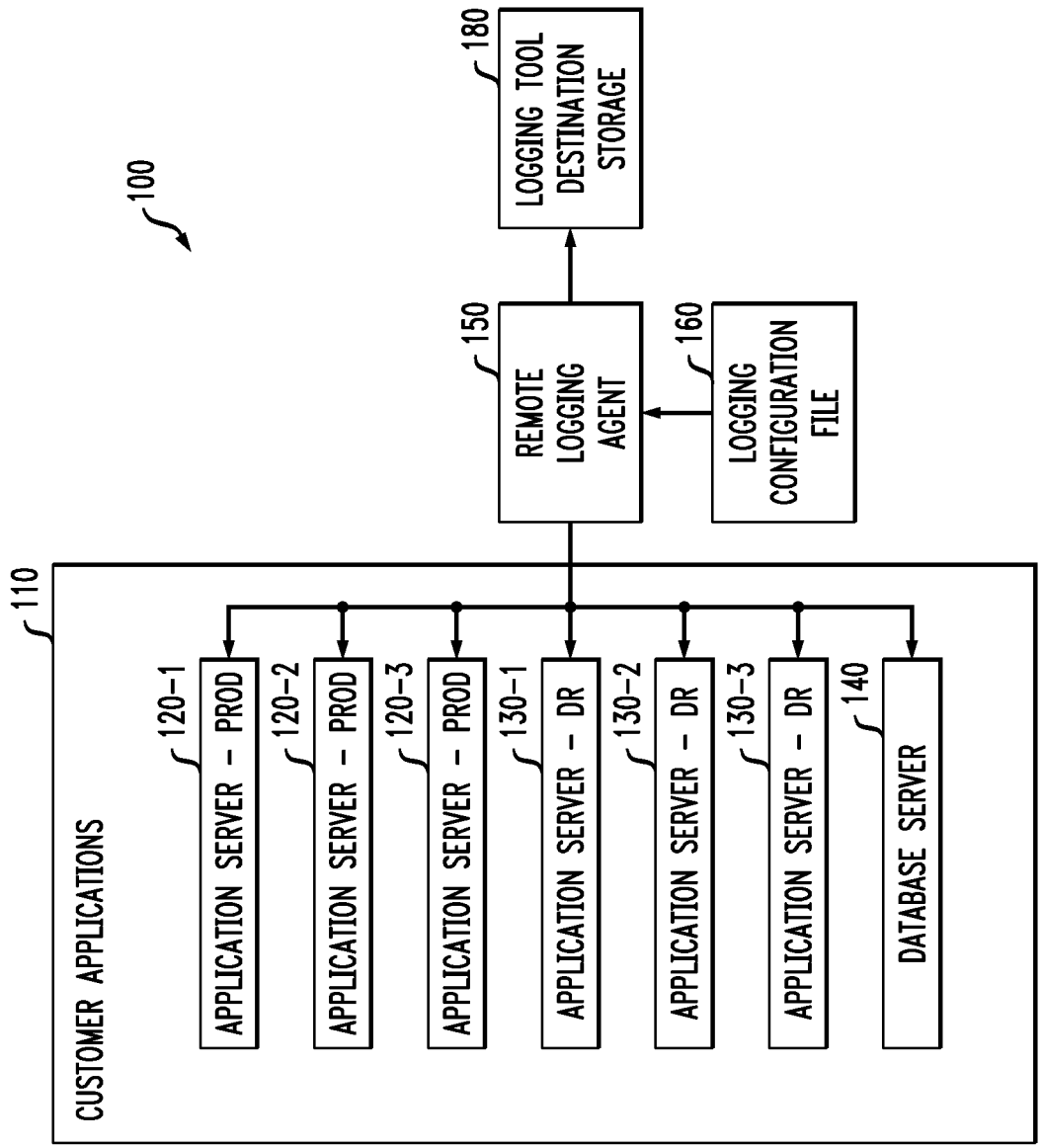
FIG. 1 illustrates an exemplary server log collection environment, according to one embodiment of the disclosure.

FIG. 1 illustrates an exemplary server log collection environment 100, according to one embodiment of the disclosure. As shown in FIG. 1, the exemplary server log collection environment 100 comprises a remote logging agent 150 to retrieve application logs from one or more servers of one or more customer applications 110, and to provide the retrieved application logs to a logging tool destination storage 180.

The exemplary servers of the customer applications 110 shown in FIG. 1 comprise one or more production (prod) application servers 120-1 through 120-3; one or more disaster recovery (DR) application servers 130-1 through 130-3 (that replicate the contents of the corresponding production application servers 120 for disaster recovery); and one or more database servers 140. While multiple types of servers are shown in FIG. 1 for illustration, an application may be implemented with only a single server type, or with additional server types not shown in FIG. 1.

As noted above, in one or more embodiments, the exemplary remote logging agent 150 is configured using one or more logging configuration files 160 specified in a data interchange format, such as JSON. In this manner, applications monitored by the exemplary remote logging agent 150 can be added or updated by means of the logging configuration files 160; and the servers associated with a particular application can be added or updated as well.

As discussed further below in conjunction with FIG. 2, the configuration information for the exemplary remote logging agent 150 in the logging configuration files 160 identifies one or more applications to be monitored; one or more servers to be monitored for each application; the necessary communication protocols and authentication credentials for accessing each identified server; a path where log data is stored for each identified server; and at least one storage destination, such as a destination folder, for storing the log data obtained from each identified server. The disclosed remote logging agent 150 can optionally obtain logs in real-time from a plurality of applications 110 and/or servers 120, 130, 140 in parallel, using a plurality of supported protocols.

In some embodiments, the exemplary remote logging agent 150 remotely connects to each monitored server 120, 130, 140 using a protocol specified for the application 110 associated with the respective server, or separately for one or more of the servers 120, 130, 140. In the embodiment of FIG. 1, the exemplary remote logging agent 150 remotely connects to: the one or more production application servers 120 using, for example, a Server Message Block (SMB) protocol (an application-layer network protocol for shared access to files and devices, and for miscellaneous inter-node communications) to gather logs from a Windows Operating System (OS); the one or more disaster recovery application servers 130 using, for example, a Secure Shell (SSH) protocol (a cryptographic network protocol for operating network services securely over an unsecured network) to gather logs from a Linux OS; and the one or more database servers 140 using, for example, a Structured Query Language (SQL) for user defined SQL queries.

The exemplary remote logging agent 150 connects to each monitored server 120, 130, 140 using the communication protocol and authentication credentials specified in the logging configuration file 160 and then obtains the log data from the identified one or more servers using the path specified in the logging configuration file 160.

As shown in FIG. 1, the exemplary remote logging agent 150 serves as middleware between the customer applications 110 and monitored server 120, 130, 140; and the logging tool destination storage 180, and is distinct and remote from the customer applications 110 and the monitored server 120, 130, 140. Among other benefits, a log forwarder does not need to be installed on each monitored server 120, 130, 140, as required by conventional techniques.

The exemplary remote logging agent 150 stores the log data obtained from the monitored server(s) 120, 130, 140 in at least one storage destination associated with the logging tool destination storage 180, such as a destination folder associated with each server 120, 130, 140 of a given customer application 110, as specified in the logging configuration files 160. In some embodiments, destination files are named using an aggregation of the name of the given customer application 110 and a short description of pseudo-random values for the given server 120, 130, 140.

The logging tool destination storage 180 may be associated with, and accessed by, for example, a plurality of logging tools, such as those commercially available from Splunk Inc. of San Francisco, Calif.

The exemplary remote logging agent 150 in the FIG. 1 embodiment is assumed to be implemented using at least one processing device. Each such processing device generally comprises at least one processor and an associated memory, and implements one or more functional modules for controlling certain features of the exemplary remote logging agent 150.

More particularly, the exemplary remote logging agent 150 in this embodiment comprises a processor coupled to a memory and a network interface, as discussed further below in conjunction with FIG. 5. The processor illustratively comprises a microprocessor, a microcontroller, an application-specific integrated circuit (ASIC), a field-programmable gate array (FPGA) or other type of processing circuitry, as well as portions or combinations of such circuitry elements. The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

Articles of manufacture comprising such processor-readable storage media are considered embodiments of the present disclosure. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The servers 120, 130, 140 in some embodiments comprise respective computers, processing devices and/or server devices associated with a particular company, organization or other enterprise. Numerous other operating scenarios involving a wide variety of different types and arrangements of processing devices and networks are possible, as will be appreciated by those skilled in the art.

The exemplary remote logging agent 150 may connect to the customer applications 110, monitored server 120, 130, 140 and the logging tool destination storage 180, for example, using at least a portion of one or more of a global computer network, such as the Internet, a wide area network (WAN), an "enterprise network," a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using IP or other related communication protocols. Numerous other operating scenarios involving a wide variety of different types and arrangements of processing devices and networks are possible, as will be appreciated by those skilled in the art As a more particular example, some embodiments may utilize one or more high-speed local networks in which associated processing devices communicate with one another utilizing Peripheral Component Interconnect express (PCIe) cards of those devices, and networking protocols such as InfiniBrand, Gigabit Ethernet or Fibre Channel. Numerous alternative networking arrangements are possible in a given embodiment, as will be appreciated by those skilled in the art.

The storage destinations associated with the logging tool destination storage 180 may include at least one storage device comprising stored files and/or objects. Although logging tool destination storage 180 may comprise multiple distinct storage devices, it will be used in subsequent description herein to refer to a single storage device. The storage device is coupled to a network and to the exemplary remote logging agent 150. The storage device in the present embodiment is implemented using one or more storage systems associated with the logging tool destination storage 180. Such storage systems can comprise any of a variety of different types of storage including network-attached storage (NAS), storage area networks (SANs), direct-attached storage (DAS) and distributed DAS, as well as combinations of these and other storage types, including software-defined storage.

Examples of particular types of storage products that can be used in implementing a given storage system of the logging tool destination storage 180 in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The storage device can illustratively comprise a single storage array, storage disk, storage drive or other type of storage device. Alternatively, the storage device can comprise one or more storage systems each having multiple storage devices implemented therein. The term "storage device" as used herein is therefore intended to be broadly construed. In some embodiments, a storage device may comprise a network share or possibly even an attached device such as a USB stick. The stored files on the storage device may already be encrypted using an encryption process implemented to protect the stored files from unauthorized access.

Although shown as separate from the logging tool destination storage 180 in FIG. 1, the exemplary remote logging agent 150 in other embodiments can optionally be implemented at least in part internally to the logging tool destination storage 180 and/or associated storage device(s). Accordingly, the exemplary remote logging agent 150 can be implemented externally to the logging tool destination storage 180, as illustrated in the figure, or at least in part internally to the logging tool destination storage 180. These arrangements are considered examples of different ways that the logging tool destination storage 180 may be "associated with" the storage devices.

In some embodiments, the exemplary remote logging agent 150 is co-located with the logging tool destination storage 180, for example, within a particular data center or other facility of a given enterprise. Alternatively, the exemplary remote logging agent 150 may be implemented in cloud infrastructure that is remote from the logging tool destination storage 180.

It should be noted that a given "set of files" or "set of log data" as those terms are used herein may include only a single file or log data; or multiple files or log data.

The exemplary remote logging agent 150 is illustratively operative in a real-time processing mode in which the exemplary remote logging agent 150 obtains the log data from the servers 120, 130, 140 in conjunction with the log data being stored in the servers 120, 130, 140. Such a real-time processing mode can operate on-demand in conjunction with the normal storage of log data on the servers 120, 130, 140. Numerous additional or alternative processing modes are possible for the exemplary remote logging agent 150, and the remote logging agent 150 may be configured to controllably switch between such multiple modes. Other examples of processing modes for the exemplary remote logging agent 150 include a scheduled direct access processing mode and a transparent processing mode.

In the scheduled direct access processing mode, the exemplary remote logging agent 150 accesses the servers 120, 130, 140 to obtain the log data that has been stored or modified since a previous access by the remote logging agent 150 to the respective servers 120, 130, 140. Such access by the exemplary remote logging agent 150 to the servers 120, 130, 140 may be via a network, as described above, or by direct access via a connection that bypasses the network.

By way of example, in one possible implementation of the scheduled direct access processing mode, the exemplary remote logging agent 150 directly accesses the storage device on a periodic basis. The exemplary remote logging agent 150 accesses the path specified in the logging configuration files 160 and obtains files and data that have been created, stored and/or changed since the last invocation. Such an arrangement is more likely to impact performance and so may be scheduled to run outside of normal business hours.

FIG. 2 illustrates an exemplary implementation of the logging configuration file 160 of FIG. 1 in further detail, according to an embodiment of the disclosure. As noted above, in one or more embodiments, a logging configuration files 160 is specified for each monitored application 110. The exemplary logging configuration file(s) 160 identifies one or more servers 120, 130, 140 associated with the given application 110, a communication protocol and authentication credentials for accessing the identified servers 120, 130, 140, a path where log data is stored on each of said identified servers 120, 130, 140, and at least one storage destination associated with the logging tool destination storage 180 for storing the log data obtained from the identified servers 120, 130, 140.

As shown in FIG. 2, the exemplary logging configuration file 160 is referred to as "appToMonitor" in line 2. The customer application 110 to be monitored is identified in line 4, along with the corresponding retrieval method (e.g., the communication protocol used by the servers 120, 130, 140 of the customer application 110) in line 5 and the destination storage folder(s) in line 6. The authentication credentials for accessing the one or more servers 120, 130, 140 identified for the particular application 110 are specified in lines 13 through 17. The path where log data is stored on each of the identified servers 120, 130, 140 is specified in lines 20 through 23.

In addition, the particular server(s) 120, 130, 140 associated with the given customer application 110 are specified in lines 26 through 49. In the exemplary embodiment of FIG. 2, a short descriptor and an IP address are provided for each identified server 120, 130, 140. "Fail" servers are specified as the disaster recovery servers 130 and "primary" servers are specified as the production servers 120 for the particular monitored application 110 of FIG. 2.

A new application 110 to be monitored by the exemplary remote logging agent 150 is added by specifying the appropriate parameters in a new logging configuration file 160. Likewise, parameters of a monitored application 110 can be updated, such as adding or removing one or more servers 120, 130, 140, by modifying the information in the corresponding logging configuration files 160 with substantially no service disruption.

While a single logging configuration file 160 is employed for each individual monitored application 110 in the embodiment of FIG. 2, a given application 110 can have multiple logging configuration files 160, or a single logging configuration file 160 can be used to configure multiple customer applications 110, as would be apparent to a person of ordinary skill in the art.

The exemplary CMS-BRAMS application associated with the logging configuration file 160 of FIG. 2 is an application credit management system that employs the SSH protocol (line 5). The logging configuration file 160 can be modified to support additional protocols, such as the SSH protocol, for example, by creating a connection channel with the remote servers and the remote logging agent 150 using the specified protocol, such as the SMB protocol. With the connection established, the exemplary remote logging agent 150 can monitor for any log data in the specified server path to replicate and propagate any new log data based on the information specified in the corresponding logging configuration file 160. Similarly, the SQL protocol can be employed to obtain log data from database tables of the database server(s) 140, by reading database tables for desired log information, based on the information specified in the corresponding logging configuration file 160 (such as the timing interval to execute the queries (e.g., every minute) in order to retrieve information).

FIG. 3 illustrates a number of exemplary log storage destination folders 300, according to some embodiments. The exemplary CMS-BRAIVIS application used in the example of FIG. 3 is an application credit management system. As noted above, the exemplary remote logging agent 150 stores the log data obtained from the monitored server 120, 130, 140 in at least one storage destination associated with the logging tool destination storage 180, such as a destination folder associated with each server 120, 130, 140 of a given customer application 110, as specified in the logging configuration files 160. In some embodiments, destination files are named using an aggregation of the name of the given customer application 110 and a short description of pseudo-random values for the given server 120, 130, 140.

FIG. 4 is a flow chart illustrating an exemplary implementation of a remote logging process 400, according to one embodiment of the disclosure. As shown in FIG. 4, the exemplary remote logging process 400 initially obtains a logging configuration file 160 for an application 110 during step 410. As noted above, in one or more embodiments, the logging configuration file 160 identifies one or more servers 120, 130, 140 associated with the application 110, a communication protocol and authentication credentials for accessing the identified servers 120, 130, 140, a path where log data is stored on each of the identified servers 120, 130, 140, and at least one logging tool storage destination 180 for storing log data obtained from the identified servers 120, 130, 140.

During step 420, the exemplary remote logging process 400 establishes a connection to the identified servers 120, 130, 140 (optionally in parallel) using the communication protocol and the authentication credentials specified in the logging configuration file 160. The log data is then obtained from the identified servers 120, 130, 140 during step 430 using the path specified in the logging configuration file 160. Finally, the log data obtained from the identified servers 120, 130, 140 is stored in the storage destination(s) specified in the logging configuration file 160 during step 440. The specified storage destination may be associated, for example, with one or more predefined logging tools.

In some embodiments, the disclosed remote logging techniques allow log data to be obtained by the exemplary remote logging agent 150 from specified paths on multiple remote servers 120, 130, 140, using various communication protocols, without an agent installed on the servers 120, 130, 140 or utilization of resources of the servers 120, 130, 140. The exemplary remote logging agent 150 is configured to monitor given applications 110 and or servers 120, 130, 140 using a standard data interchange format, such as JSON.

Among other benefits, the disclosed exemplary remote logging agent 150 serves as middleware between the servers 120, 130, 140 and the logging tool destination storage 180, allowing for various communication protocols to be supported for server communications and multiple existing logging tools to be used for analyzing the obtained log data.

One or more embodiments of the disclosure provide improved methods and apparatus for remote logging of server data. The foregoing applications and associated embodiments should be considered as illustrative only, and numerous other embodiments can be configured using the techniques disclosed herein, in a wide variety of different applications.

It should also be understood that the disclosed remote logging agents, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for remote logging of server log data may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components of the disclosed remote logging system are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a remote logging platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
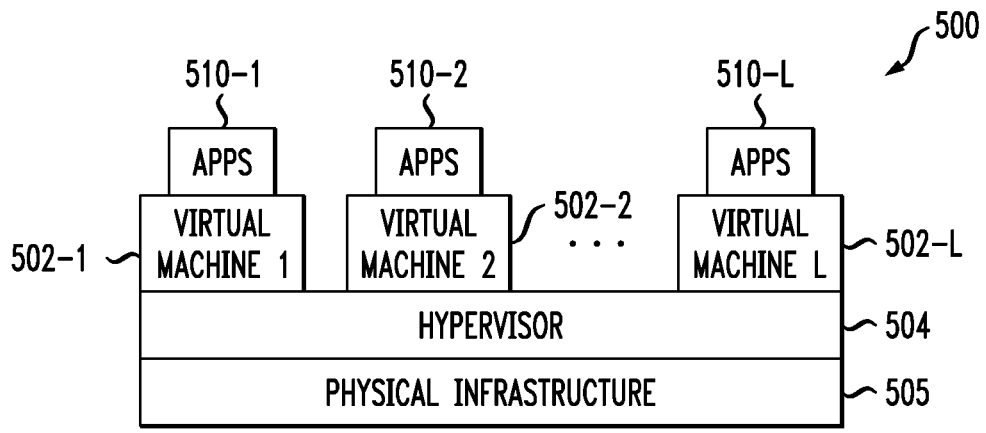
FIG. 5 illustrates an exemplary processing platform that may be used to implement at least a portion of one or more embodiments of the disclosure comprising a cloud infrastructure.

Referring now to FIG. 5, one possible processing platform that may be used to implement at least a portion of one or more embodiments of the disclosure comprises cloud infrastructure 500. The cloud infrastructure 500 in this exemplary processing platform comprises virtual machines (VMs) 502-1, 502-2, . . . 502-L implemented using a hypervisor 504. The hypervisor 504 runs on physical infrastructure 505. The cloud infrastructure 500 further comprises sets of applications 510-1, 510-2, . . . 510-L running on respective ones of the virtual machines 502-1, 502-2, . . . 502-L under the control of the hypervisor 504.

The cloud infrastructure 500 may encompass the entire given system or only portions of that given system, such as one or more of clients, servers, controllers, or computing devices in the system.

Although only a single hypervisor 504 is shown in the embodiment of FIG. 5, the system may of course include multiple hypervisors each providing a set of virtual machines using at least one underlying physical machine. Different sets of virtual machines provided by one or more hypervisors may be utilized in configuring multiple instances of various components of the system.

An example of a commercially available hypervisor platform that may be used to implement hypervisor 504 and possibly other portions of the system in one or more embodiments of the disclosure is the VMware® vSphere™ which may have an associated virtual infrastructure management system, such as the VMware® vCenter™. As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC of Hopkinton, Mass. The underlying physical machines may comprise one or more distributed processing platforms that include storage products.

Particular types of storage products that can be used in implementing a given storage system of the remote logging system in an illustrative embodiment include VNX® and Symmetrix VMAX® storage arrays, software-defined storage products such as ScaleIO™ and ViPR®, all-flash and hybrid flash storage arrays such as Unity™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system, although in other embodiments a given tenant can have multiple containers. The containers may be utilized to implement a variety of different types of functionality within the system. For example, containers can be used to implement respective compute nodes or cloud storage nodes of a cloud computing and storage system. The compute nodes or storage nodes may be associated with respective cloud tenants of a multi-tenant environment of the system. Containers may be used in combination with other virtualization infrastructure such as virtual machines implemented using a hypervisor.

As is apparent from the above, one or more of the processing modules or other components of the disclosed remote logging apparatus may each run on a computer, server, storage device or other processing platform element. A given such element may be viewed as an example of what is more generally referred to herein as a "processing device." The cloud infrastructure 500 shown in FIG. 5 may represent at least a portion of one processing platform.

Figure 6:
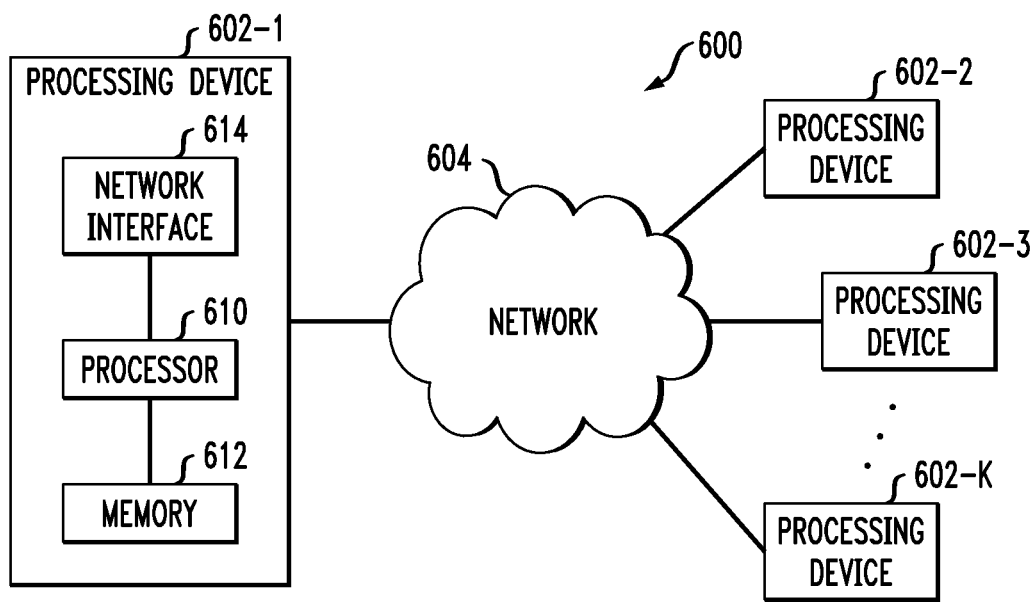
FIG. 6 illustrates another exemplary processing platform that may be used to implement at least a portion of one or more embodiments of the disclosure.

Another example of a processing platform is processing platform 600 shown in FIG. 6. The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in FIGS. 1, 2 and 4 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of the system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a logging configuration file for at least one application, wherein said logging configuration file identifies: (i) one or more servers associated with said at least one application, (ii) a communication protocol and authentication credentials for accessing said identified one or more servers, (iii) a path where log data is stored on each of said identified one or more servers, and (iv) at least one storage destination for storing log data obtained from said identified one or more servers;
establishing, using at least one processing device of a logging agent, a connection to each of said identified one or more servers using said communication protocol and said authentication credentials, wherein said logging agent is distinct and remote from said at least one application and said identified one or more servers;
obtaining, using said at least one processing device of said logging agent, said log data from said identified one or more servers using said path via said established connection; and
storing, using said at least one processing device of said logging agent, said log data from said identified one or more servers in said at least one storage destination specified for storing said obtained log data, wherein said at least one storage destination specified for storing said obtained log data is associated with one or more of a plurality of predefined logging tools for indexing said obtained log data.

2. The method of claim 1, wherein said communication protocol comprises one or more of a plurality of predefined communication protocols.

3. The method of claim 1, wherein said logging configuration file is specified using a predefined data interchange format.

4. The method of claim 1, wherein said identified one or more servers comprise one or more of production servers, disaster recovery servers and database servers.

5. The method of claim 1, further comprising the step of obtaining said log data from a plurality of said identified one or more servers in parallel.

6. The method of claim 1, further comprising the step of obtaining said log data from a plurality of said applications in parallel.

7. The method of claim 1, wherein said logging agent serves as middleware between said at least one or more servers and said at least one storage destination associated with one or more of said plurality of predefined logging tools.

8. A computer program product, comprising a non-transitory machine-readable storage medium having encoded therein executable code of one or more software programs, wherein the one or more software programs when executed by at least one processing device perform the following steps:

obtaining a logging configuration file for at least one application, wherein said logging configuration file identifies: (i) one or more servers associated with said at least one application, (ii) a communication protocol and authentication credentials for accessing said identified one or more servers, (iii) a path where log data is stored on each of said identified one or more servers, and (iv) at least one storage destination for storing log data obtained from said identified one or more servers;

establishing, using at least one processing device of a logging agent, a connection to each of said identified one or more servers using said communication protocol and said authentication credentials, wherein said logging agent is distinct and remote from said at least one application and said identified one or more servers;

obtaining, using said at least one processing device of said logging agent, said log data from said identified one or more servers using said path via said established connection; and storing, using said at least one processing device of said logging agent, said log data from said identified one or more servers in said at least one storage destination specified for storing said obtained log data, wherein said at least one storage destination specified for storing said obtained log data is associated with one or more of a plurality of predefined logging tools for indexing said obtained log data.

9. The computer program product of claim 8, wherein said logging configuration file is specified using a predefined data interchange format.

10. The computer program product of claim 8, wherein said identified one or more servers comprise one or more of production servers, disaster recovery servers and database servers.

11. The computer program product of claim 8, further comprising the step of obtaining said log data from a plurality of said identified one or more servers in parallel.

12. The computer program product of claim 8, further comprising the step of obtaining said log data from a plurality of said applications in parallel.

13. The computer program product of claim 8, wherein said logging agent serves as middleware between said at least one or more servers and said at least one storage destination associated with one or more of said plurality of predefined logging tools.

14. The computer program product of claim 8, wherein said communication protocol comprises one or more of a plurality of predefined communication protocols.

15. An apparatus, comprising:
a memory; and
at least one processing device, coupled to the memory, operative to implement the following steps:

obtaining a logging configuration file for at least one application, wherein said logging configuration file identifies: (i) one or more servers associated with said at least one application, (ii) a communication protocol and authentication credentials for accessing said identified one or more servers, (iii) a path where log data is stored on each of said identified one or more servers, and (iv) at least one storage destination for storing log data obtained from said identified one or more servers;

establishing, using at least one processing device of a logging agent, a connection to each of said identified one or more servers using said communication protocol and said authentication credentials, wherein said logging agent is distinct and remote from said at least one application and said identified one or more servers;

obtaining, using said at least one processing device of said logging agent, said log data from said identified one or more servers using said path via said established connection; and storing, using said at least one processing device of said logging agent, said log data from said identified one or more servers in said at least one storage destination specified for storing said obtained log data, wherein said at least one storage destination specified for storing said obtained log data is associated with one or more of a plurality of predefined logging tools for indexing said obtained log data.

16. The apparatus of claim 15, wherein said communication protocol comprises one or more of a plurality of predefined communication protocols.

17. The apparatus of claim 15, wherein said logging configuration file is specified using a predefined data interchange format.

18. The apparatus of claim 15, wherein said identified one or more servers comprise one or more of production servers, disaster recovery servers and database servers.

19. The apparatus of claim 15, further comprising at least one of the following steps:

obtaining said log data from a plurality of said identified one or more servers in parallel; and obtaining said log data from a plurality of said applications in parallel.

20. The apparatus of claim 15, wherein said logging agent serves as middleware between said at least one or more servers and said at least one storage destination associated with one or more of said plurality of predefined logging tools.

\* \* \* \* \*

UNITED STATES PATENT AND TRADEMARK OFFICE
CERTIFICATE OF CORRECTION

Page 1 of 1

PATENT NO.       : 10,834,070 B1
APPLICATION NO.  : 15/883453
DATED            : November 10, 2020
INVENTOR(S)      : Felipe Silva dos Santos It is certified that error appears in the above-identified patent and that said Letters Patent is hereby corrected as shown below:

On the Title Page

Item (73) Assignee
Replace "Rock Round, TX" with -- Round Rock, TX --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*